Sept. 17, 1963   M. NADLER   3,104,376
APPARATUS FOR STORING AND PROCESSING NUMERICAL INFORMATION
Filed July 10, 1961   9 Sheets-Sheet 1

Inventor:
Morton Nadler,
By his attorneys,
Baldwin & Wight

Sept. 17, 1963    M. NADLER    3,104,376
APPARATUS FOR STORING AND PROCESSING NUMERICAL INFORMATION
Filed July 10, 1961    9 Sheets-Sheet 4

000 ⟶

011 ⟶

Inventor;
Morton Nadler;
By his attorneys,
Baldwin + Wight

Sept. 17, 1963 M. NADLER 3,104,376
APPARATUS FOR STORING AND PROCESSING NUMERICAL INFORMATION
Filed July 10, 1961 9 Sheets-Sheet 5

Sept. 17, 1963 M. NADLER 3,104,376
APPARATUS FOR STORING AND PROCESSING NUMERICAL INFORMATION
Filed July 10, 1961 9 Sheets-Sheet 9

Fig.6

Inventor:
Morton Nadler;
By his attorneys,
Baldwin + Wight

United States Patent Office 3,104,376
Patented Sept. 17, 1963

3,104,376
APPARATUS FOR STORING AND PROCESSING
NUMERICAL INFORMATION
Morton Nadler, Fresnes, France, assignor to Compagnie
des Machines Bull (Societe Anonyme), Paris, France
Filed July 10, 1961, Ser. No. 122,950
Claims priority, application Switzerland July 18, 1960
4 Claims. (Cl. 340—172.5)

The present invention concerns apparatus for storing and processing numerical information.

In known apparatus of this type, an address indicating the location of the storage is allocated to each datum, so that any information is accessible by way of the address. When the nature of the information is known, this principle does not in itself create any difficulty, although the programming would be simpler if the items of information could be directly designated by their constituent elements.

If the nature of the information stored in each storage element is not known, matters are substantially more complicated. This occurs in the course of the processing of the information, for example when a considerable number of items of information are classified in accordance with a code, which may be the name of a person, a geographical indication, the destination of a semi-finished product, a dictionary word, a mathematical expression, etc. Even when the code is supplied in a natural order, the exact information must be found by seeking it in the storage elements. Having regard to the nature of the items of information stored and that of the storage elements, this often involves complicated programming.

A second set of problems to be resolved by the aforesaid apparatus consists, in the case of predetermined items of information, in establishing an order which differs from that in which the said items of information are stored. Thus, for example, the items of information supplied as a result of a statistical search can be alphabetically or geographically classified and they must thereafter be arranged in accordance with another viewpoint, for example in accordance with a numerical quantity. In known apparatus of the aforesaid type, it is necessary to devote considerable time to the establishment of such a classification.

The present invention concerns an apparatus for storing and processing information, wherein the information is accessible substantially immediately and, in accordance with one embodiment, can be classified in any predetermined order.

Another object of the present invention is to provide a storage system by means of which the stored information can be found substantially immediately even if the location in which it is stored, in other words its address, is unknown.

Finally, another object of the present invention is to provide an information storage apparatus in which the items of information can be read and stored through an arrangement of blocking elements. With the most recent high-density storage elements, it is possible to store, for example, $10^6$ binary digits in a volume of 1 cubic centimetre. In such a high-density storage memory utilising, for example, cryotrons, it is extremely difficult to provide the external connections for the reception and extraction of the items of information. One of the objects of the present invention is to provide such an arrangement of blocking elements in such manner that the number of external connections is reduced to about $3m$, $m$ representing the number of words registered.

For a better understanding of the invention and to show how it may be carried into effect, the same will now be described, by way of example, with reference to the accompanying drawings, in which:

FIGURE 4 illustrates how FIGURES 4a, 4b and 4c are to be assembled, FIGURES 4a, 4b and 4c, taken in combination, are an electrical circuit diagram of a local control unit according to a particular embodiment of the invention.

Figure 1:
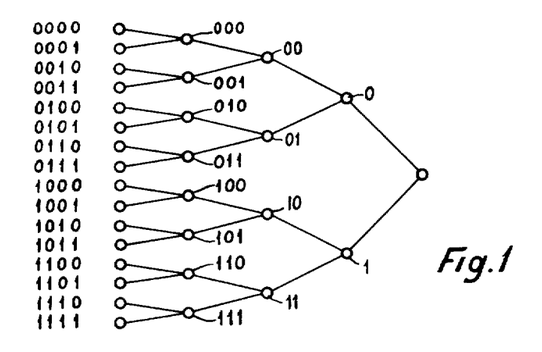
FIGURE 1 diagrammatically illustrates an apparatus for storing and processing information with the necessary storage elements.

FIGURE 1 illustrates diagrammatically a store consisting of a series of elements. The latter are distributed in a number of ranks, the elements of rank 0 being denoted by a four-digit binary number, the elements of rank 1 by a three-digit binary number, the elements of rank 2 by a two-digit binary number and the elements of rank 3 by a binary digit. In the apparatus illustrated in FIGURE 1, sixteen elements of rank 0 are provided. These elements are the basic elements of the store. They may be designed in the same way as those of hitherto known storage devices. The other storage elements, that is to say, the elements of ranks 1 to 3, are auxiliary elements which store the data only temporarily in order to re-transmit them.

In this example, two elements of rank 0 are connected in each instance to one element of rank 1 (through control means not shown in FIGURE 1). Two elements of rank 1 are similarly connected to an element of immediately higher rank, that is to say, to an element of rank 2, etc., each set of two storage elements of one rank being associated with a storage element of immediately higher rank, so as to form a selective transfer arrangement of pyramid form. For establishing a given order for the items of information stored in the basic elements of rank 0, the said items of information are directed to the auxiliary storage elements of higher ranks, the desired sequence then being obtained, as will hereinafter be shown.

As will be seen by way of example from FIGURE 1, the elements 1010 and 1011 are connected to the auxiliary storage element 101 of rank 1 and the latter element, as also the auxiliary storage element 100, is connected to the auxiliary storage element 10 of rank 2. The four-digit designations of the storage elements constitute the addresses of the items of information stored therein.

If now an item of information is transmitted in the manner hereinafter described, a binary digit is added to the item of information each time that it is transmitted to an element of higher rank, so that at the top of the pyramid the item of information is accompanied by its complete address. If, for example, an item is transmitted from the element 0001 to the element 000, the address added is "1." In the transmission of the same information to the element 00, the address becomes "01," in the transmission to the element "0" the address becomes "001," and so on, so that the information is accompanied by its complete address, namely "0001" when it appears at the output of the apparatus, and hence the storage element from which this information emanates can readily be found.

The mechanism of the transmission of the items of information will be explained with reference to FIGURE 2, which shows in greater detail a part of the basic circuit diagram of FIGURE 1 for the purpose of explaining the transmission of the information. This part comprises the storage elements 0000, 0001, 0010, 0011 of rank 0 and the auxiliary storage elements 000 and 001 of rank 1. A local control unit 20 controls through a gate 21 the travel of the items of information between the two elements 0000 and 0001, on the one hand, and the element 000 on the other hand. A local control unit 120 controls through a gate 121 the travel of the items of information between the two elements 0010 and 0011 on the one hand, and the corresponding element 001 on the other hand. The arrows show the direction of travel of the information. A local control unit such as 20 will be stated to be associated with the storage elements 0000 and 0001, and the element 000 will be called the corresponding element of immediately higher rank of these elements 0000 and 0001.

Figure 2:
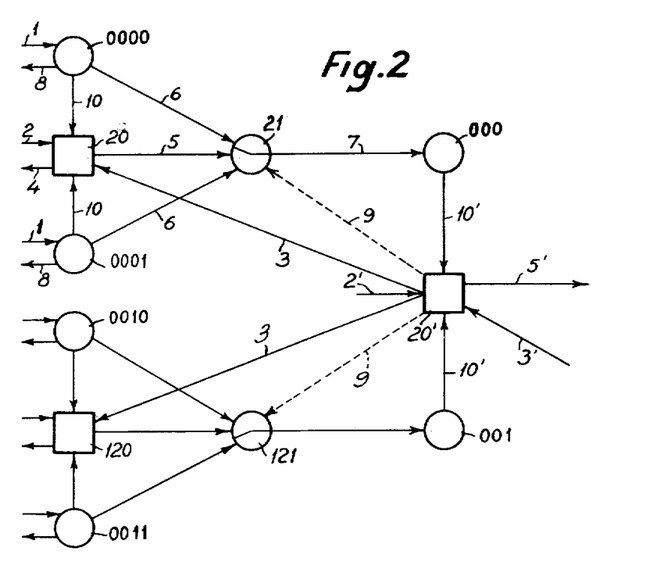
FIGURE 2 illustrates a part of FIGURE 1 with the blocking elements controlling the flow of information and with the local control units controlling blocking devices.

In FIGURE 2, the reference 1 denotes the inputs through which the items of information can be introduced into the storage elements, for example the elements 0000 and 0001. The reference 2 denotes the input through which the data defining the processing to be undergone by the stored information are transmitted to the local control unit 20. A local control unit is also associated with each set of two storage elements of higher rank, the control unit associated with the auxiliary storage elements 000 and 001 is denoted by 20'. A local control unit such as 20' associated with two auxiliary storage elements 000 and 001 is also stated to be associated with the two local control units of immediately lower ranks, i.e. 20 and 120, which control the travel of the items of information to the auxiliary elements 000 and 001, with which the control unit 20' is associated. Each control unit of higher rank such as 20' is connected to the two control units associated therewith by lines 3, and these lines 3 transmit signals indicating that the auxiliary storage elements associated with the control unit of higher rank under consideration are free or occupied, that is to say, whether or not items of information can be transmitted to the auxiliary storage elements. If, for example, an item of information is transmitted from the element 000 to the element 00 of higher rank (FIGURE 1), the control unit 20 will be informed by the line 3 that the next item of information can be transmitted through the gate 21 to the element 000. It depends upon the program of the operation being carried out whether the item of information of the element 0000 or of the element 0001 is transmitted to this element 000. The line 2' has the same function as the line 2.

The output 4 of the local control unit 20 is provided to indicate, in the search for a single predetermined word in the store, that this word has been found in one of the two associated storage elements 0000 or 0001. The local control unit 20 is connected to the gate 21 associated therewith, through a line 5 which transmits an appropriate control signal to the said gate. In accordance with the signal transmitted through the line 5, and item of information registered in the elment 0000 or an item of information registered in the element 0001 is transferred to the element 000. For the transfer of the item of information, the storage elements 0000 and 0001 are connected by lines 6 to the gate 21 which, in turn, is connected to the storage element 000 by a line 7. When the address of an item of information is known, this information can also be directly extracted from the storage element concerned, the lines 8 being provided for this purpose. In addition, the items of information contained in the elements 0000 and 0001 can be analysed by the associated control unit 20, through lines 10. This is necessary when any items of information emanating from the two storage elements are to be processed in the local control unit, and when as a function of the result of this processing a signal controlling the gate 21 must be transmitted through the line 5. Finally, a line 9 may be provided to connect an associated local control unit of a higher rank to a gate of a lower rank. In the reception of items of information for the purpose of storing them in an element, this line may be used to control the transmission of information from the top of the pyramid to the chosen storage elements.

For a further explanation of the operation, reference will be made to FIGURE 3, which shows an example of the establishment of a predetermined order for the stored items of information. It will be assumed that there are stored in eight storage elements any items of information which must be classified in accordance with an alphabetical order. In FIGURE 3, only letters are indicated, although of course other items of information may be stored in the elements. However, in the example under consideration, only the letters determine the desired placing in order. They are stored in the elements in any order, as may also be seen from FIGURE 3a. There is transmitted to all the local control units, through lines 2, the order to analyse and compare the letters of the two elements which are associated with them and to transmit to the storage element of immediately higher rank that one of these letters which appears first in the alphabet. These operations may be seen from FIGURE 3b. In order to determine the address of each item of information, the latter is completed towards the right (FIGURE 3) at each transfer, as is also indicated. The storage elements each comprise a registering position $p0$ in which there is permanently stored a binary digit, 0 or 1, as indicated in thick letters in FIGURES 3a to 3s. This may be done for each storage element by means of a conductor permanently connected between the voltage source and the input gate of the corresponding storage element of immediately higher rank. In addition, each auxiliary storage element of rank 1 comprises a position $p1$ to which is transferred to the binary digit registered in the position $p0$ of a corresponding storage element of rank 0, from which an item of information emanates in the course of a transfer of information. Each auxiliary storage element of rank 2 comprises two positions $p1$ and $p2$ to which the binary digits registered in the positions $p0$, $p1$ respectively are transferred from a corresponding storage element of rank 1, from which an item of information emanates in the course of a transfer of information, etc. The letters G and B registered in the first two storage elements have been transferred to the associated local control unit. The latter has established that B must be transferred before G and has informed the associated gate 21 through the line 5, so that the information B only is transmitted to the associated storage element of rank 1.

Figure 3A:
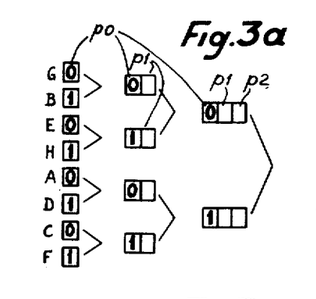
FIGURES 3a to 3s illustrate an example of the establishment of the desired order for the partial items of information, which example can be put into practice with the aid of the apparatus of FIGURES 1 and 2.
Figure 3B:
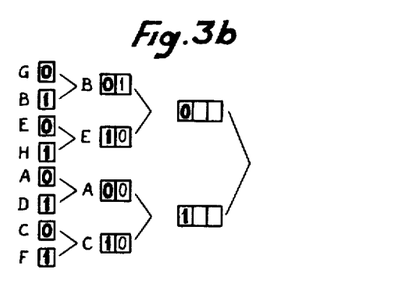
Figure 3C:
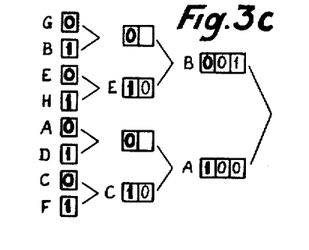
Figure 3D:
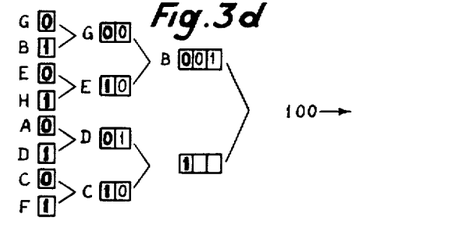
Figure 3E:
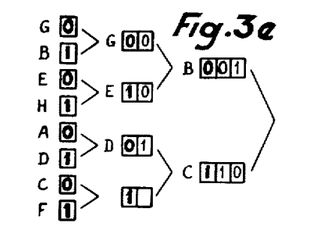
Figure 3F:
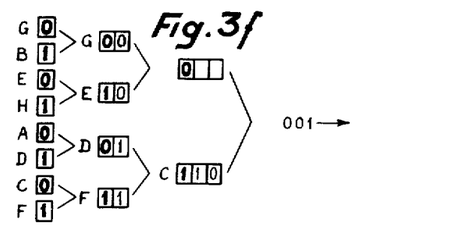
Figure 3G:
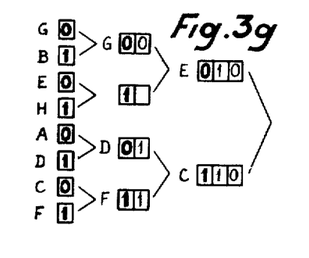
Figure 3H:
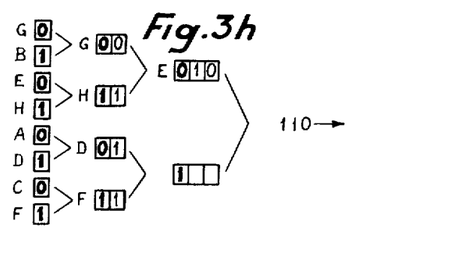
Figure 3I:
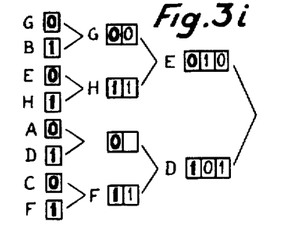
Figure 3J:
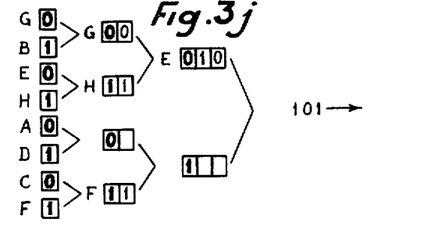
Figure 3K:
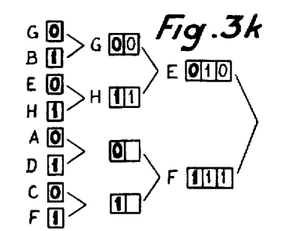
Figure 3L:
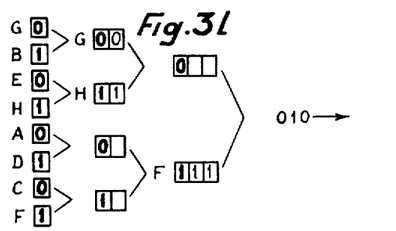
Figure 3M:
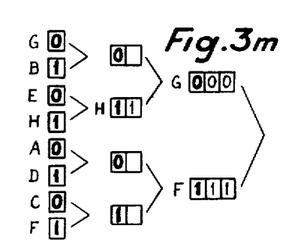
Figure 3N:
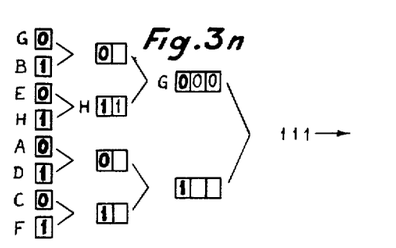
Figure 3O:
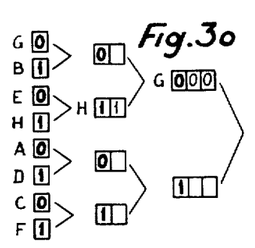
Figure 3P:
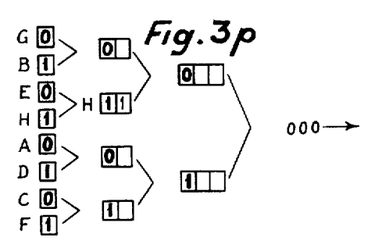
Figure 3Q:
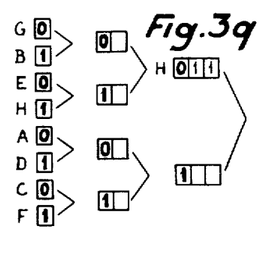
Figure 3R:
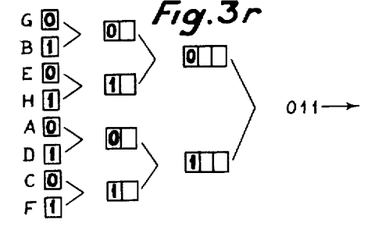
Figure 3S:
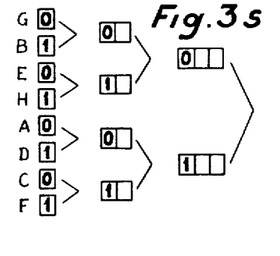

In the course of the succeeding cycle, the items of information of the elements or rank 1 are compared with one another in a similar way, that is to say, in the example adopted, the letters B and E, and A and C. A and B are transferred to the storage elements of rank 2. In the course of the succeeding cycle, A and B are compared with one another and the address of A, i.e. 100, is supplied to the top of the pyramid. The complete information associated with A can now be directly obtained from the storage element 100. During the delivery of the address of "A," the empty auxiliary stores are occupied by the succeeding items of information. After the transmission of the information "B" from the element of rank 1 to the corresponding element of rank 2, the local control unit of rank 1 transmits to the corresponding associated control unit of rank 0 through the line 3 a signal which indicates that the associated element of rank 1 is free. In the course of the third stage (FIGURE 3d), the information "G" is transferred into this associated element of rank 1. It will thus be seen how the information is successively supplied in the chosen order of succession. It is not necessary to give an exact description of the operations, because they can be deduced without difficulty from FIGURES 3a to 3s. It will merely be mentioned that all the addresses are successively supplied, and that in all $$2^{n+1}+n$$

transfer cycles are necessary if $2^n$ represents the number of elements of rank 0.

When an isolated word is sought whose address is unknown, this word may also be directly obtained. The local control units of rank 0 obtain the search code through the line 2 and search whether a coincidence exists between the stored information and the code. When coincidence has been found, the address of the word sought is communicated through the line 4. With the aid of the henceforth known address, the information may be directly extracted from the corresponding basic element of the store by the use of means known in the technique of random-access stores. Direct access to the basic elements of the store just described may also be obtained by providing in association with this store a switching pyramid such as that hereinafter described with reference to FIGURE 6.

The introduction of information into storage elements of known addresses may be carried out by using the means hereinbefore indicated and also by using the means provided in the device forming the selective transfer pyramid according to the invention. The connections 9 provided for placing the gates 21 under the control of the local control units of the immediately higher order make it possible, in fact, to adjust the transfer of information from the top of the pyramid to a storage element of predetermined address.

The production of the stored information and the storage then take a little longer than when the means provided for direct access are provided, but it is then possible to avoid the provision of such direct-access means.

The control units can therefore perform the following functions:

(1) For extracting in a predetermined order, in accordance with a given criterion, information stored in the store, each local control unit processes the items of information of at least two storage elements as a function of the said criterion, compares these items of information with one another and transmits to a storage element of immediately higher rank at least a part of the selected information or a datum representing this information.

(2) In the search for a particular word, the local control unit compares with the word sought the corresponding words of the two associated storage elements and, in the event of coincidence, communicates the address of the word in such manner that the information stored with the word sought in the same storage element can be directly examined at the henceforth known address. For example, in the storage of data relative to a person, it is possible by virtue of the introduction of the name first to obtain the address and thereafter to obtain details regarding this person by direct access.

(3) The local control units may in addition be so designed that they transmit in a given order items of information belonging to a particular class, which are stored in a number of storage elements. For example, in the case of a search for semi-finished products having particular characteristics, the local control units can transmit other details regarding all the semi-finished products having the said characteristics, in a given order related to any parameter, for example size, weight, etc.

(4) In the course of the extraction in a given order of the items of information registered in the store, the local control units supply signals indicating whether the auxiliary storage elements concerned are occupied or free.

(5) The local control units also make it possible to determine the address of a stored word which is closest to a given word. The given word (or the order of search) corresponds, for example in the case of the storage of data relative to persons, to an age. By forming the absolute difference between the given age and the registered age for each person, it is possible to obtain the address of the person most closely approaching the given age. The local control units are in this case so designed as to transmit the absolute value of the difference to the storage element of immediately higher rank. This difference is thereafter exploited in the elements of immediately higher rank, that is to say, it is compared with the difference appearing in a neighboring storage element, as is shown in FIGURES 3a to 3s.

When a binary arrangement of the pyramid is provided, as illustrated in FIGURE 1, $2^n$ storage elements of rank 0 are then used. Then, $2^n-1$ auxiliary storage elements, i.e. storage elements from rank 1 to rank $n$ . . . are provided, which may in addition be of smaller capacity than the storage elements of rank 0. In addition, $2^n-2$ local control units are necessary.

Figures 4, 4A:
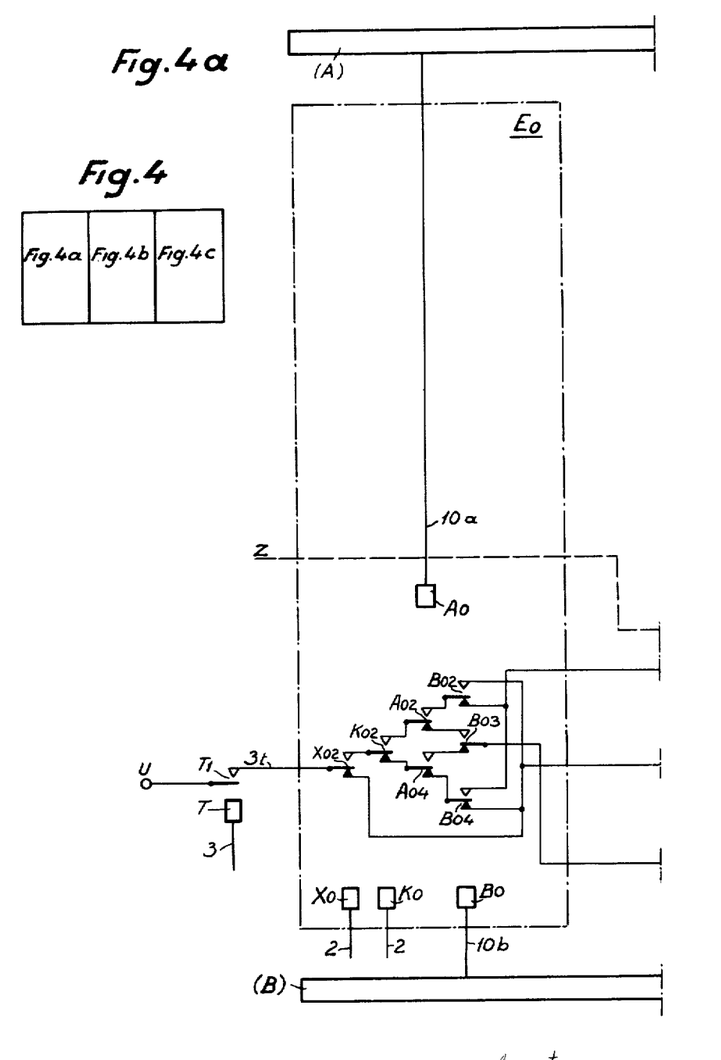
Figure 4B:
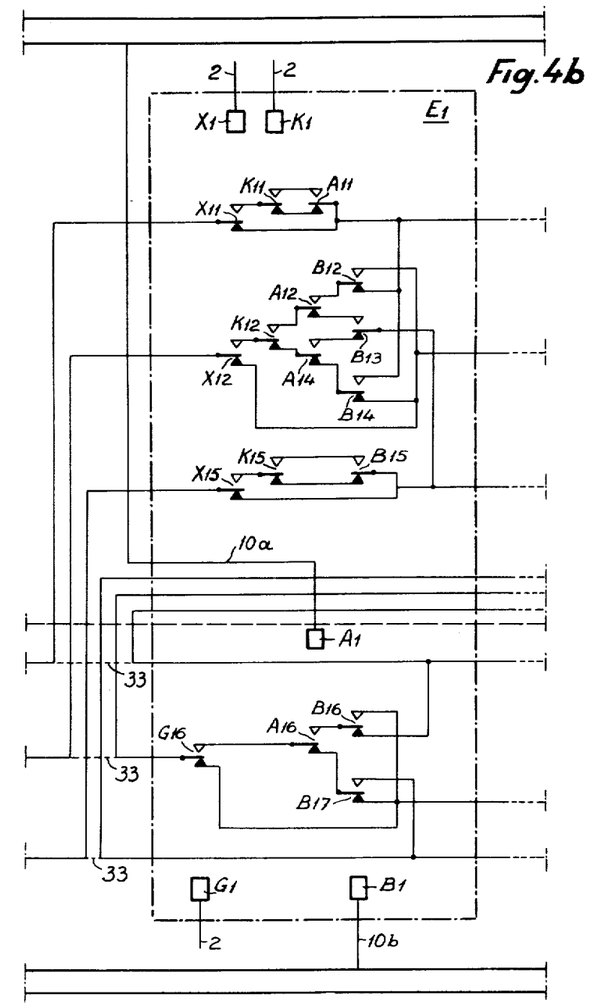
Figure 4C:
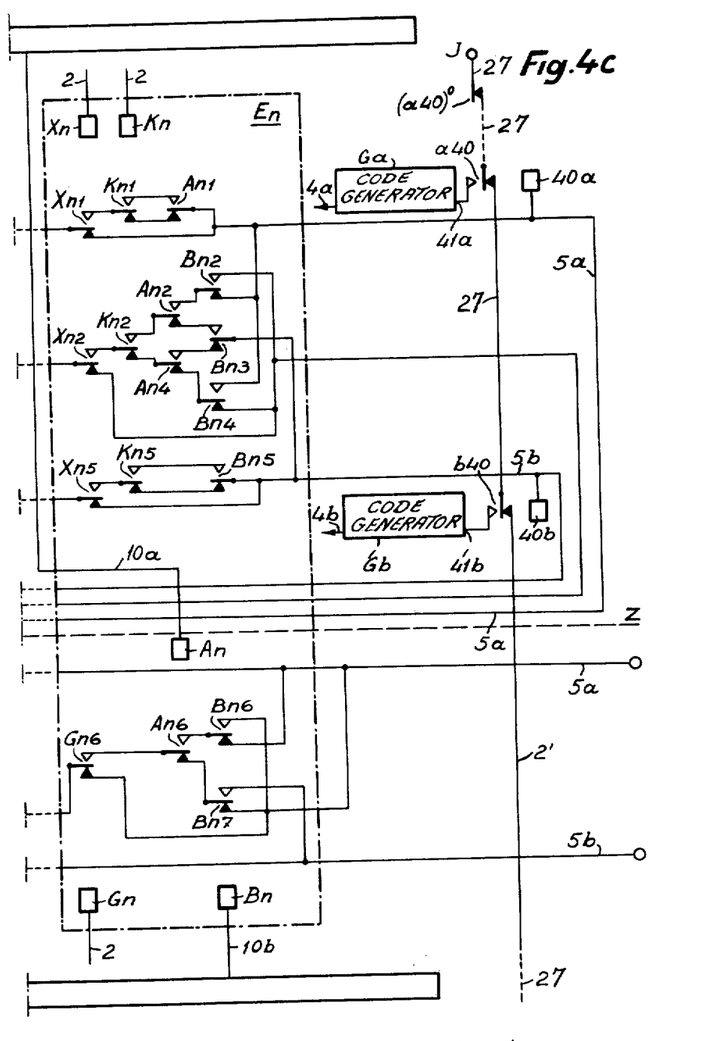

A particular constructional form of a local control unit of rank 0 (such as 20) is illustrated in FIGURES 4a, 4b and 4c, which are combined in the manner indicated in FIGURE 4. A local control unit (such as 20', FIGURE 2) of higher rank comprises only the circuits illustrated in that part of these figures which is situated below the chain line ZZ, and these circuits comprise the conductors 33 (illustrated in chain lines in FIGURE 4b) which do not exist in the local control units of rank 0.

The circuit forming the local control unit in accordance with this embodiment is a circuit comprising $n+1$ stages E0, E1 . . . E$n$, $n+1$ being the number of binary positions employed in each storage element to register the data involved in adjusting the selective transfers taking place in the apparatus according to the invention. The stage E0 carries out the processing of the digits registered in the binary position 0 of the storage elements associated with the local control unit. The stage E1 carries out the processing of the digits stored in the binary position 1, etc. The binary position 0 of a storage element is used to register a binary digit indicating the validity (or presence) of an item of information registered in this storage element.

The digit 1, for example, indicates the validity or the presence and the digit 0 indicates the invalitdity or the absence of an item of information. The other binary positions 1 to $n$ are used to register binary digits which represent on the one hand the data serving to select the items of information sought among the items registered, and on the other hand the data serving to assign an order thereto. In FIGURES 4a, 4b and 4c, the stages E0, E1 and E$n$ only have been shown. The other stages are identical to the stage E1.

The symbolic representation of the relays has been used in these figures to indicate in a convenient manner the switching operations involved in this embodiment, but it is to be understood that these switching operations may equally well be carried out by means of any element having appropriate characteristics, for example a semiconductor, a magnetic core or film, a cryogenic element, etc.

The conductors 2 transmit to the local control unit the selecting signals comprising the binary signals $x0, x1$ . . . $xn, k0, k1$ . . . $kn, g1$ . . . $gn$.

The signals $x0, x1$ . . . $xn$ indicate whether or not the binary elements of order 0, 1 . . . $n$ respectively of the stored information are elements which have to be compared to the selection key in order to determine which stored items of information must be transmitted through the pyramid.

The signals $k0, k1$ . . . $kn$ represent the binary elements of order 0, 1 . . . $n$, respectively, forming the selection key K.

The signals $g1$ . . . $gn$ indicate whether or not the binary elements of order 1 . . . $n$, respectively, of the stored items of information are elements serving to determine the order of transfer of the stored items of information.

The various conductors 2 lead to the relays X0, X1 . . . X$n$, K0, K1 . . . K$n$, G1 . . . G$n$, respectively.

The conductors 10$a$ and 10$b$ transmit to the local control unit the signals $a$0, $a$1 . . . $an$ on the one hand, and $b$0, $b$1 . . . $bn$ on the other hand, representing respectively the values of the binary elements of order 0, 1 . . . $n$ of the items of information A and B stored in the two storage elements (A) and (B) with which the local control unit is associated. The various conductors 10$a$ and 10$b$ lead to the relays A0, A1 . . . A$n$, B0, B1 . . . B$n$, respectively.

The conductor 3, which transmits a signal indicating that the storage element of higher rank corresponding to the local control unit under consideration is free, as has been stated, leads to a relay T which, when energised by such a signal, closes its contact T1. The closing of this contact T1 renders possible the application of an appropriate voltage U to the input conductor 3$t$ of the circuit controlled by the various relays just mentioned.

It will be seen that a relay such as K1 controls contacts K11, K12, K15, that a relay such as A1 controls contacts A11, A12, A14, A16, that a relay such as B1 controls contacts B12, B13, B14, B15, B16, B17, that a relay such as G1 controls contacts G16, and that connections are established between these contacts in such manner that a voltage U applied to the conductor 3$t$ is transmitted to the output conductor 5$a$ when the item of information A comprises the binary elements forming the selection key and, if the information B also comprises the binary elements forming the selection key, when the information A is not lower than the information B. The voltage applied to the conductor 3$t$, on the other hand, is transmitted to the output conductor 5$b$ when the information B comprises the binary elements forming the selection key and, if the information A also comprises the binary elements forming the selection key, when the information A is lower than the information B.

The conductors 5$a$ and 5$b$ lead to appropriate control inputs of the gate associated with the local control unit under consideration, so that the voltages set up at these conductors 5$a$ and 5$b$ effect the transfer of information from one of the storage elements associated with this local control unit to the corresponding storage element of higher rank, in accordance with the conditions hereinbefore indicated.

Since the items of information transmitted by the storage elements of rank 0 comprise the binary elements forming the selection key, the local control units associated with the storage elements of higher rank need comprise only the circuits illustrated in FIGURES 4$a$, 4$b$ and 4$c$ below the chain line ZZ.

An appropriate logical circuit is provided to change the validation digit registered in position 0 of a basic storage element as soon as a transfer of information has been effected from this element in such manner as to invalidate the information registered in this element until the end of the extracting operation in progress. Thus, in the course of an extracting operation at the store, the transfer of information can take place only once from each basic element.

Similarly, or in any other appropriate way, the binary digit signifying the invalidation or absence of an item of information registered in an auxiliary storage element may be located in the position 0 of this element as soon as a transfer of information has been effected from this element and until the registration of a further item of information in the latter.

The registration of this binary invalidation digit in an auxiliary storage element is accompanied by the application of an appropriate voltage to the conductor 3 leading to the local control unit which controls the travel of the items of information to this auxiliary storage element. Since each local control unit comprises a stage E0 examining the validity of the information stored in the associated storage elements, the transfer of information between any storage element and the corresponding storage element of immediately higher rank can finally take place only if the element under consideration contains a valid item of information, and provided that the corresponding element does not contain such an item of information.

The conductors 4$a$ and 4$b$ are provided to supply in a direct manner the address of the basic elements (A) and (B), respectively, when an item of information comprising the selection key is sought. These conductors 4$a$ and 4$b$ transmit respectively address signals emitted by the code generators G$a$ and G$b$ respectively. The inputs 41$a$ and 41$b$ of these generators can receive control signals from the terminal J through the links 27 and through the contacts $a$40 and $b$40 respectively.

A series circuit is established from the terminal J by means of the links 27 connecting together the contacts $a$40 and $b$40 of each local control unit of rank 0 and also connecting them to those of the adjacent local control units of rank 0, the terminal J being connected to the contact $(a40)^0$ of the local control unit situated at one end of the series circuit thus formed.

In their inoperative position, the contacts $a$40 and $b$40 of the various local control units transmit from one to the other a signal applied to the terminal J. When one of these contacts moves into the operative position, a control signal applied to J is transmitted by this contact to the corresponding code generator, but the series circuit formed of the links 27 and the contacts $a$40 and $b$40 is then interrupted, so that no other code generator can receive the control signal applied to J, and if a number of these contacts are simultaneously in the operative position that one which is closest to the terminal J only receives the control signal applied to the terminal J. The code generator which corresponds thereto is therefore the only one to emit an address signal.

The contacts $a$40 and $b$40 of each local control unit are controlled by relays 40$a$ and 40$b$ respectively, of which the windings are connected to the outputs 5$a$ and 5$b$ respectively of the local control unit. A signal is applied to J when it is desired to obtain directly the address of a basic element which contains an item of information comprising a selection key represented by signals applied to the conductors 2.

If the element (B), for example, contains an item of information comprising the given selection key, a voltage is set up at the output 5$b$ of the local control unit and the contact $b$40 changes into the operative position and transmits to the corresponding code generator G$b$ the signal applied to J. The conductor 4$b$ then transmits the address signal generated by the code generator G$b$.

The address thus having been determined, the item of information can be extracted from the store by the use of means known in the technique of random-access stores, or by means of a switching pyramid such as that hereinafter described with reference to FIGURE 6.

The local control unit just described is capable, on the one hand, of selecting the information registered in the store by comparing binary elements of given position of these items of information with binary elements forming a selection key, and on the other hand of comparing with one another binary elements of given position of items of information registered in pairs of storage elements of the system, so as to control the extraction of these items of information in a predetermined order.

Circuits of the same type as those described in the foregoing may in addition be provided in the local control unit to form algebraic values or the absolute values of the differences $\Delta_A = A - K$ and $\Delta_B = B - K$, and to utilise these values in place of the items of information A and B respectively in the circuits controlling and effecting the travel of items of information to the top of the pyramid.

Figure 5:
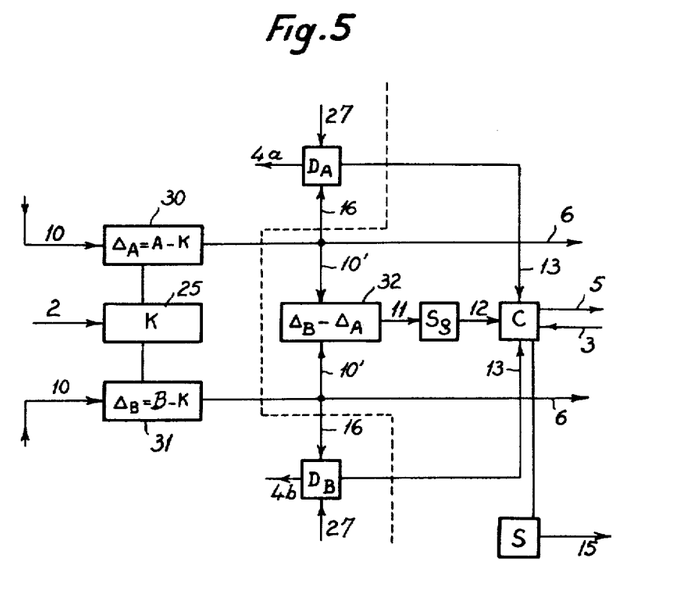
FIGURE 5 is a diagram illustrating the principle of a local control unit according to another embodiment of the invention.

FIGURE 5 illustrates another particular constructional form of a local control unit, such as may be employed for example in the apparatus of FIGURES 1 and 2. The block 25 designates another auxiliary store in which the key K (transmitted by the line 2) for the selection of information from the connected storage elements is stored for a brief period. The auxiliary store 25 is connected to two comparing arrangements 30 and 31 which are in turn connected through lines 10 to the two associated storage elements. As indicated in FIGURE 5, the comparing arrangements 30 and 31 form the difference between the value K transmitted through the line 2 and the corresponding stored values A and B. The comparing arrangement 30 forms, for example, the difference $\Delta_A = A - K$ and the comparing arrangement 31 the difference $\Delta_B = B - K$, A and B representing the numerical values (transmitted to the local control unit) of the content of the two associated storage elements. However, the comparing arrangements 30 and 31 may also be used to determine a logical coincidence between the components A, B and K. These differences are transmitted through the lines 10' to a comparing arrangement 32 in which the differences $\Delta_B - \Delta_A$ is formed. Since the subtractions effected in the comparing arrangements 30 and 31 do not influence the difference between A and B, the comparing arrangement 32 supplies a signal which directly expresses the difference between A and B.

The comparing arrangement 32 is connected by a line 11 to an arrangement Sg which evaluates the sign of the difference $\Delta_B - \Delta_A$ and transmits through the line 12 of the gate control unit C items of information which determine which of the differences $\Delta_B$ or $\Delta_A$ must be transmitted with priority to the storage element of immediately higher order.

The output of the comparing arrangements 30 and 31 is in addition applied through lines 16 to the units $D_A$ and $D_B$ which determine whether the difference satisfies the search order transmitted through the lines 2'. For example, a unit such as $D_A$ supplies an output signal through the line $4_a$ when the difference $\Delta_A$ is zero and an appropriate input signal is applied through the lines 2'. This output signal supplied by the line $4_a$ may be the complete information or its address. If, to give another example, only the items of information for which the values $\Delta_A$ and $\Delta_B$ remain below a given absolute value are to be transmitted, the unit $D_A$ and $D_B$ then prevent the transmission to the auxiliary storage elements of the items of information which do not satisfy this condition. The two elements $D_A$ and $D_B$ are connected by lines 13 to the gate control unit C. This unit C therefore receives the information from Sg, $D_A$ and $D_B$, as also, through the lines 3, the information that the storage element of immediately higher rank is free or occupied. The gate is then controlled by the line 5 as a function of these input items of information. In addition, there is connected to the gate control unit C a unit S which is also connected, through a line 15, to the storage element of immediately higher rank and which completes the address of the information transmitted, so that (as shown in FIGURE 3) it is possible to determine at any instant, whence the transmitted information comes. It will be seen that only a partial item of information is transmitted from the storage cells of rank 0 to those of rank 1. In other words, for example, the items of information A and B are not transmitted, but the items of information $\Delta_A$ and $\Delta_B$ are transmitted. The numerical differences $\Delta_A$ and $\Delta_B$ must therefore be formed only in the local control units of rank 0, while in the control units of higher rank these differences already represent the input signal. The local control units of rank 0 therefore constitute the whole of FIGURE 5, while those of immediately higher rank require only the part situated in the drawing to the right of the chain line. The part situated to the left of the said line may also be designated as a comparing device.

Of course, it is also possible to provide systems in which only some of the functions of the devices of FIGURES 1 to 5 can be performed. An example of simplified embodiments of the invention is illustrated in FIGURE 6.

Figure 6:
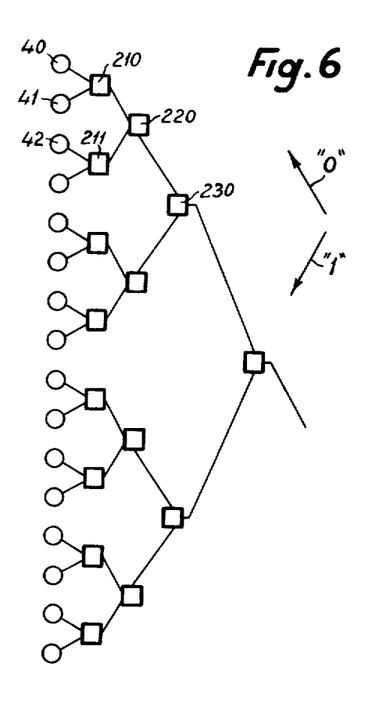
FIGURE 6 illustrates an apparatus for storing information in which the items of information emanating from storage elements of known address are accessible in a simple manner.

FIGURE 6 illustrates an apparatus by means of which the items of information can be either introduced or extracted through a switching pyramid. In this case, storage elements 40, 41, 42, etc. are provided only at the locations of rank 0 of the pyramid, while all the higher ranks are each represented only by gates 210, 211, 212 . . . 220, 221, etc. In the drawing, the storage elements are represented by circles and the gates by squares. If it is now necessary to provide a connection between the apex of the pyramid and a particular storage element, the gates of successive ranks of the pyramid are controlled by the successive digits of the address, so as to permit the passage of the information in either of the directions indicated by the arrows "0" and "1."

It will therefore be seen that a connection between the apex of the pyramid and each storage element may be made in a short time, while the connection established through the blocking elements may be used either for storage or for reading the information.

The apparatus illustrated in FIGURE 6 is particularly applicable to high-density stores, for example those utilizing cryotrons, because the number of external connections required is considerably reduced.

In order to simplify the explanation, only the elements performing logical functions essential for the operation of the apparatus have been described. These elements may be designed in the form of series, series-parallel or parallel circuits and employing well known techniques. Of course, the control elements, such as for example the elements which must be provided to control the various operations in time, may consist of circuits known in electronics.

A number of variants of the embodiments here set forth are possible. Thus, for example, it is not at all necessary for two elements of lower rank of the pyramid always to be connected to an element of immediately higher rank. A number of elements of lower rank may also be connected to an element of higher rank.

I claim:

1. Apparatus for the storage and processing of information comprising a plurality of storage elements arranged in several ranks, a plurality of gates and a plurality of local control units, at least two storage elements of zero rank being connected over a gate to a single storage element of first rank, at least two storage elements of first rank being connected over a gate to a single storage element of second rank and so on, so as to form a transfer arrangement of pyramid form, each local control unit being associated with each group of said storage elements of the same rank which are connected over a gate to a single storage element of the next higher rank, each local control unit of a rank, except those of zero rank, comprising means for indicating that the storage elements associated with this local control unit are free or occupied, and means for comparing at least appropriate portions of information stored in an associated storage element with corresponding portions of information stored in another associated storage element, each local control unit of zero rank comprising means for comparing at least appropriate portions of information stored in an associated storage element with corresponding portions of information stored in another associated storage element, each said means for indicating of a local control unit of an arbitrarily determined rank, which cannot be zero rank, being connected to the said means for comparing of a local control unit of the next lower rank, for accordingly causing this local control unit of the lower rank to control a transfer of information from the storage elements associated with this local control unit of lower rank in the direction of the storage elements associated with said local control unit of the arbitrarily determined rank.

2. Apparatus according to claim 1, wherein each local control unit comprises an input, means for determining appropriate portions of information stored in an associated storage element which have to be compared, means for comparing these appropriate portions of information with a key supplied to said input, and for accordingly causing this local control unit to control a transfer of information.

3. Apparatus according to claim 1, wherein each local control unit associated with a storage element of zero rank comprises an input, means for comparing appropriate portions of information stored in said associated storage element with a key supplied to said input, the said means for comparing comprising means for providing a result of comparison and for controlling the transfer of this result in the place of said information.

4. Apparatus according to claim 1, wherein each storage element comprises means for associating a predetermined information element with each information read out of this storage element, so that, at the apex of the pyramid, each information read out is accompanied by a group of predetermined information which constitutes its address.

References Cited in the file of this patent
UNITED STATES PATENTS 2,848,607    Maron ---------------- Aug. 19, 1958